(12) United States Patent
Böhm et al.

(10) Patent No.: US 6,347,059 B2
(45) Date of Patent: Feb. 12, 2002

(54) INTEGRATED MEMORY HAVING A BIT LINE REFERENCE VOLTAGE, AND A METHOD FOR PRODUCING THE BIT LINE REFERENCE VOLTAGE

(75) Inventors: Thomas Böhm, Zorneding (DE); Zoltan Manyoki, Ontario (CA); Robert Esterl, München; Thomas Röhr, Aschheim, both of (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/816,925

(22) Filed: Mar. 23, 2001

(51) Int. Cl.$^7$ .................................................. G11C 7/02
(52) U.S. Cl. ........................................ 365/210; 365/207
(58) Field of Search ............................. 365/210, 205, 365/207, 208, 189.01

(56) References Cited

U.S. PATENT DOCUMENTS 5,297,079 A * 3/1994 Ha .............................. 365/210
6,195,281 B1 * 2/2001 Kim ............................ 365/210

* cited by examiner

*Primary Examiner*—Vu A. Le
(74) *Attorney, Agent, or Firm*—Herbert L. Lerner; Laurence A. Greenberg; Werner H. Stemer

(57) ABSTRACT

A semiconductor memory, in particular a ferroelectric semiconductor memory, has a differential write/read amplifier which is connected, via transfer transistors, to a bit line pair. The bit line pair includes a bit line and a corresponding reference bit line. The differential write/read amplifier is for reading data from and writing data to the memory capacitor (MC). In order to improve the accuracy of the bit line reference voltage, a main reference bit line is connected, via a charge switching element, to a reference voltage. At least one further reference bit line is connected to the main reference bit line via an equalization switching element for charge equalization between the reference bit lines.

10 Claims, 2 Drawing Sheets

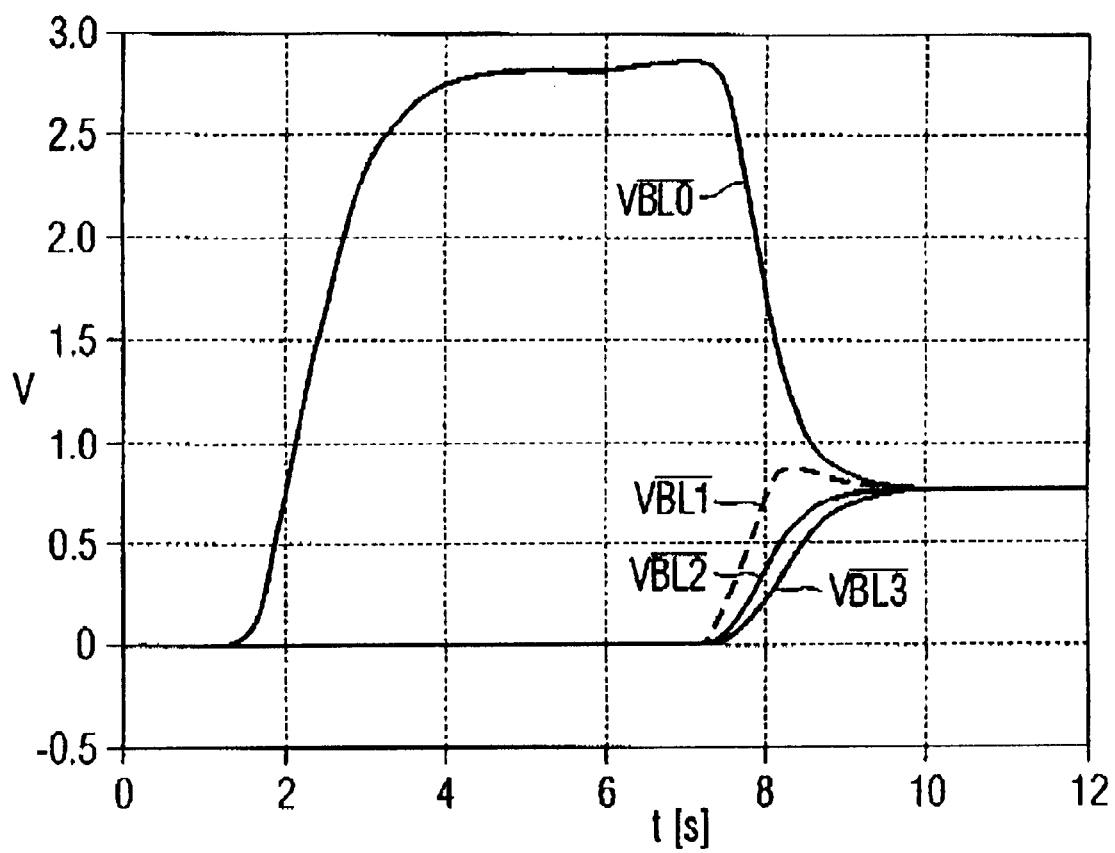

INTEGRATED MEMORY HAVING A BIT LINE REFERENCE VOLTAGE, AND A METHOD FOR PRODUCING THE BIT LINE REFERENCE VOLTAGE

BACKGROUND OF THE INVENTION

Field of the Invention

The present invention relates to an integrated memory, in particular a ferroelectric memory, having memory capacitors that are configured at the intersections of word lines and bit line pairs. Each of the bit line pairs includes a bit line and a corresponding reference bit line that receives a bit line reference voltage. The integrated memory includes a selection transistor via which, the memory capacitor is connected to a bit line. The control electrode of the selection transistor is connected to the respective word line. The integrated memory includes a differential write/read amplifier which is connected via transfer transistors to the respective bit line pair for reading data from and writing data to the memory capacitor. The present invention also relates to a corresponding method for producing the bit line reference voltage for the integrated memory.

Such an integrated memory is known, as DRAM or FeRAM, and an example is disclosed in published German patent application DE 199 03 199 A1. A defined reference voltage is required on the reference bit line in order to read data from a ferroelectric memory capacitor in a memory cell of the one-transistor/one-capacitor type. In a ferroelectric memory capacitor, the information is stored by the polarization state of the dielectric. When the stored information is read by the differential sense amplifier, this can result, for example, in a voltage of 1.2 V occurring or being measured for a logic 1, by virtue of the corresponding polarization state, on the bit line, which is connected to the memory capacitor. Alternatively, when the stored information is read by the differential sense amplifier, this can result, for example, in a voltage level of 0.5 V occurring or being measured on the bit line for a logic 0, by virtue of the opposite polarization state. The differential amplifier compares this voltage level with the reference voltage on the reference bit line. The exact value of this bit line reference voltage is in this case determined in advance in a test phase, and the reference voltage is set appropriately. For this purpose, for example, all of the memory cells in the ferroelectric memory have a voltage corresponding to a logic 0 written to them, or they are suitably polarized. A specific bit line reference voltage is then applied. The differential amplifier is used to read all of the memory cells. If the value of the bit line reference voltage were to be chosen to be excessively low, logic 1's would also be read incorrectly. The value of the bit line reference voltage is therefore increased, and the read process is repeated, in a subsequent step. This is carried out until all of the stored logic zeros are read correctly from the ferroelectric cells. A logic 1 is then written to all of the memory cells, and the memory contents based on a higher bit line reference voltage are read. The reference voltage on the bit lines is in this case reduced until all of the stored logic 1's can be read correctly. This results in a voltage window for the tested memory chip, in which the suitable reference voltage must be chosen. A disadvantage of the known prior art is the limited accuracy of its bit line reference voltage. This is because conventional reference voltage generators or reference cells produce, for example, an output voltage in the range from 0.3 to 0.7 V, with an absolute voltage accuracy of 30 mV on the bit lines. The value of the relative error in the bit line reference voltage is, accordingly, in the range from 10% to 4.2%.

U.S. Pat. No. 4,937,476, discloses an integrated memory, in which the reference voltage for a differential amplifier is produced with a charge switching element, equalization switching elements and capacitances. The reference voltage is produced by charge equalization between the capacitances.

SUMMARY OF THE INVENTION

It is accordingly an object of the invention to provide an integrated memory and a method of producing a reference voltage to be applied to reference bit lines of an integrated memory which overcomes the above-mentioned disadvantageous of the prior art apparatus and methods of this general type. In particular, it is an object of the invention to improve the accuracy of the bit line reference voltage using simple means, and to specify a corresponding operating method for producing the bit line reference voltage for the integrated memory.

With the foregoing and other objects in view there is provided, in accordance with the invention, an integrated memory that includes word lines and bit line pairs. Each one of the bit line pairs includes a first bit line and a reference bit line for receiving a bit line reference voltage. The reference bit line of one of the bit line pairs defines a main reference bit line. Intersections are defined by locations where the word lines and the bit line pairs intersect. Memory capacitors are disposed adjacent the intersections of the word lines and the bit line pairs. A particular one of the memory capacitors is disposed adjacent a particular one of the word lines and adjacent a particular one of the bit line pairs. The particular one of the bit line pairs includes a particular one of the first bit lines and a particular one of the reference bit lines. A selection transistor has a control electrode connected to the particular one of the word lines. The selection transistor connects the particular one of the memory capacitors to the particular one of the first bit lines. Transfer transistors are connected to the particular one of the bit line pairs. A differential write/read amplifier is connected, by the transfer transistors, to the particular one of the bit line pairs for reading data from and writing data to the particular one of the memory capacitors. A charge switching element is provided for receiving a reference voltage and for connecting the main reference bit line to the reference voltage. An equalization switching element is provided. The reference bit line of one of the bit line pairs defines an additional reference bit line having a parasitic capacitance. The main reference bit line has a parasitic capacitance. The equalization switching element is for connecting the additional reference bit line to the main reference bit line to equalize charge between the parasitic capacitance of the main reference bit line and the parasitic capacitance of the additional reference bit line.

In accordance with an added feature of the invention, the reference voltage is provided by a constant voltage source. The circuitry for this can be produced very easily, with sufficient accuracy even for higher voltage values.

Alternatively, it would also be possible to use a reference cell although, because of it's aging, this can lead to reduced reference voltage accuracy as the time of operation increases. Furthermore, the timing for producing the reference voltage would be more complex.

In accordance with an additional feature of the invention, four reference bit lines are connected to one another by three equalization switching elements for charge equalization. This first allows the accuracy of the reference voltages on the reference bit lines to be quadrupled. Second, the value of the voltage connected to the main reference bit line can still be kept sufficiently low. In the case of four interconnected reference bit lines this may be, for example, around 2.8 V, making it possible to produce a standard bit line reference voltage of exactly 0.7 V after charge equalization.

In accordance with another feature of the invention, in order to obtain a simple circuit layout, the equalization switching elements can be connected in series, and can be in the form of equalization transistors.

In accordance with a further feature of the invention, the charge switching element is in the form of a p-channel transistor. This enables the control voltage the gate of the p-channel transistor to be kept sufficiently low, bearing in mind the comparatively high reference voltage to be transmitted, for example, 2.8 V.

With the foregoing and other objects in view there is also provided, in accordance with the invention, a method for producing a reference voltage on reference bit lines of an integrated memory. The method includes the following steps: connecting a reference voltage to a main reference bit line; disconnecting the reference voltage from the main reference bit line; connecting at least one further reference bit line in parallel with the main reference bit line, thus equalizing the charge stored in the parasitic reference bit line capacitances which are connected in parallel; and splitting the reference voltage into a number of bit line reference voltages of equal magnitude. In this case, it presents no problem to produce the reference voltage using a voltage generator having an output voltage that is considerably higher than that in the prior art, for example 2.8 V instead of 0.7 V. The absolute voltage accuracy, for example, 30 mV will not be changed. The relative error in the reference voltages on the individual reference bit lines is, in consequence, obviously correspondingly reduced. If the parasitic capacitance of a selected reference bit line is charged to this increased reference voltage and the charge stored in the process is then distributed between the parasitic capacitances of further reference bit lines, all of the bit line reference voltages have a correspondingly reduced error. If, for example, the bit line reference voltage is produced using a voltage generator which has an output voltage with a voltage accuracy of 30 mV in the range from 1.2 V to 2.8 V, the error on the reference bit lines after charge equalization according to the inventive method is now only 2.5% to 1.0% for four interconnected reference bit lines. The four bit line reference voltages are now of equal magnitude, since the four parasitic capacitances of the bit lines are also of equal magnitude.

Other features which are considered as characteristic for the invention are set forth in the appended claims.

Although the invention is illustrated and described herein as embodied in an integrated memory having a bit line reference voltage, and a method for producing the bit line reference voltage, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 3 shows a voltage/time graph of the bit line reference voltages for a circuit configuration including the portions shown in FIGS. 1 and 2, when the inventive method is used.

DESCRIPTION OF THE PREFERRED EMBODIMENTS

Figure 1:
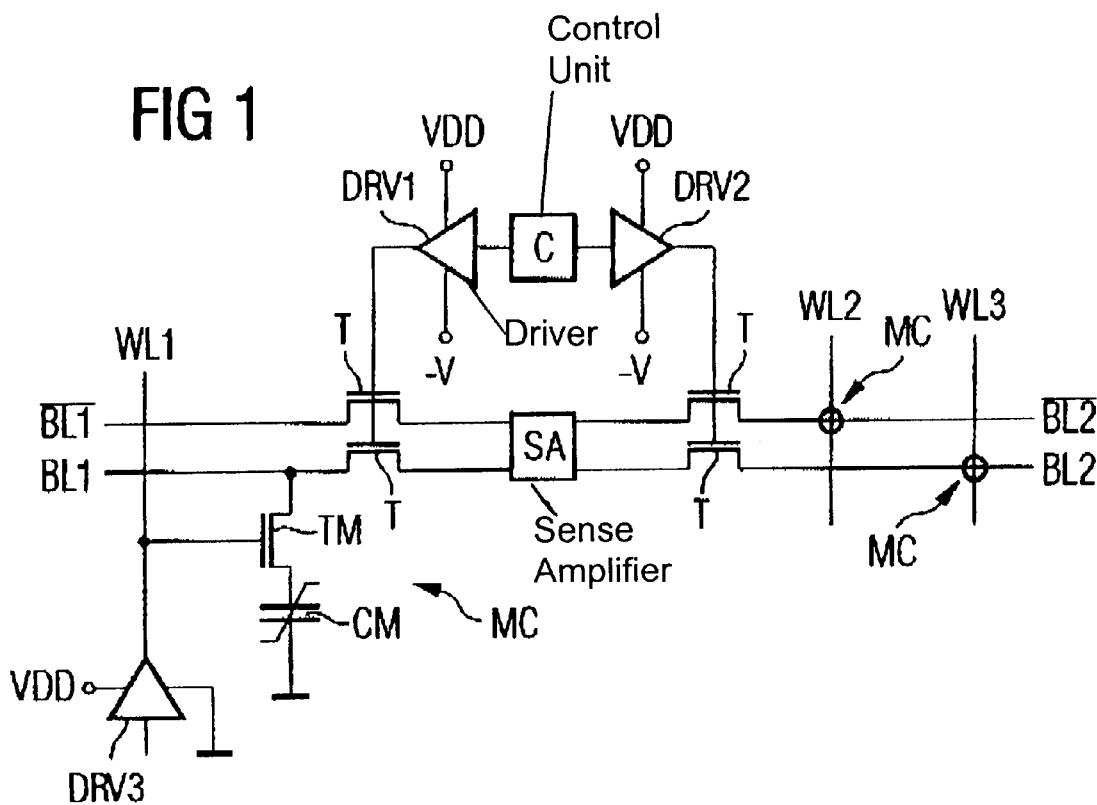
FIG. 1 shows a circuit diagram of a portion of a ferroelectric memory configuration.

Referring now to the figures of the drawing in detail and first, particularly, to FIG. 1 thereof, there is shown a ferroelectric memory (FeRAM) having known memory cells MC of the one-transistor/one-capacitor type at the intersections of word lines WLi and bit line pairs. The bit line pairs include bit lines BLi and reference bit lines /BLi. A selection transistor TM provided in each memory cell MC connects a ferroelectric memory capacitor CM in that memory cell MC to the respectively associated bit line BLi. The gate of the selection transistor TM is connected to the associated word line WLi. For simplicity reasons, FIG. 1 shows only two bit line pairs BL1, /BL1, BL2, /BL2 and three word lines WL1, WL2, WL3. Obviously, in practice, a FeRAM has a much greater number of bit lines and word lines. The illustrated memory configuration furthermore has a sense amplifier SA, which is connected to individual bit lines of a bit line pair via a respective transfer transistor T. The sense amplifier SA is a known differential amplifier which, when read access is being made to memory capacitor CM, amplifies a voltage difference on the associated bit line pair (BLi, /BLi), and passes this on to data lines which are not illustrated in any more detail. During read access, this potential difference thus results in one of the bit lines (/BLi) of the respective bit line pair being used as the reference bit line which is at a defined reference voltage, while the contents of the memory capacitor CM are written to the associated other bit line (BLi) of the bit line pair. The sense amplifier SA is, however, also used during write accesses for transmitting data supplied to it, via one of the bit line pairs, to the ferroelectric memory cells MC. The sense amplifier SA may, for example, be in the form of a flipflop circuit, as is normal for DRAMs. The transfer transistors T can be actuated such that, at any one time, they connect only one of the bit line pairs BLi, /BLi to the sense amplifier SA. The sense amplifier can thus access either the left-hand bit line pair BL1, /BL1 or the right-hand bit line pair BL2, /BL2. The memory illustrated in FIG. 1 furthermore has a control unit C, which is used to actuate the transfer transistors T. The outputs of the control unit C are connected, via a respective driver DRVi, to the transfer transistors T of each of the bit line pairs BLi, /BLi. The drivers DRVi are thus supplied with a positive supply potential of VDD and a negative potential of −V, and produce output signals which are likewise at these levels. The word lines WLi are actuated via a word line decoder, which is not illustrated, and via further drivers DRV3, of which only one has been illustrated in FIG. 1. The further drivers DRV3 are supplied with the positive supply potential VDD and ground. The word lines WLi are thus either at the positive supply potential VDD or at ground potential. In contrast, when switched off, the negative potential −V is applied to the gates of the transfer transistors T, and this potential is below the switch-on voltage of these transistors. Since the transfer transistors T are normally-on transistors, their switch-on voltage is negative. The negative potential −V is chosen such that the transfer transistors T are reliably switched off when this potential is applied to their gate.

Figure 2:
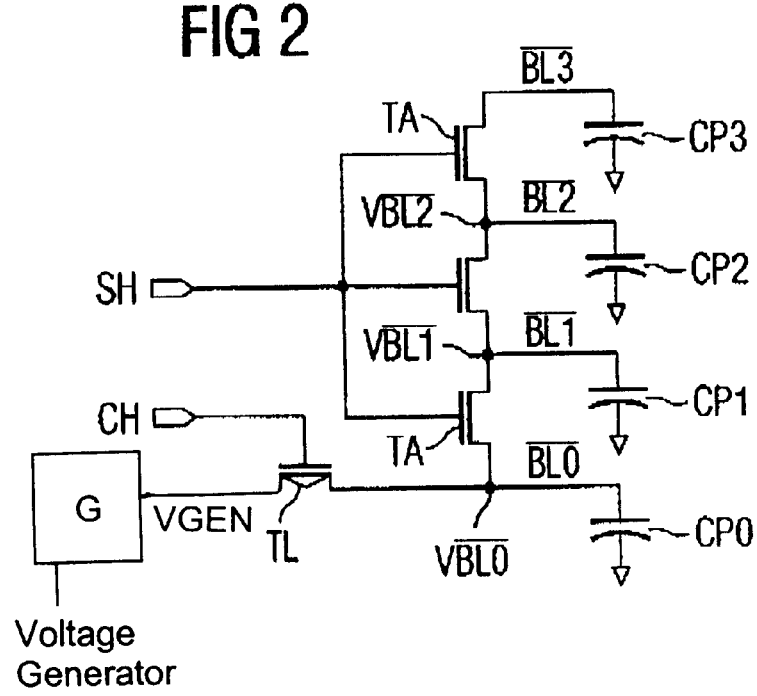
FIG. 2, shows a circuit diagram of another portion of the ferroelectric memory configuration with switching elements for producing the bit line reference voltages.

In order to allow the bit line reference voltage V/BLi to be produced, for example, for a read process from the ferroelectric memory capacitor CM in the circuit configuration as shown in FIG. 1, this circuit configuration is supplemented by the circuit configuration as shown in FIG. 2. In this case, by way of example, four memory cells MC and their reference bit lines /BLi are in each case combined to form a circuit unit with the bit line reference voltage being produced jointly. For simplicity reasons, FIG. 2 shows only the reference bit lines /BLi and the circuit elements required to produce the bit line reference voltage V/BLi, without the memory capacitors. However, two further reference bit lines /BL0 and /BL3 have been added in FIG. 2. The reference bit line /BL0 is used, as shown in FIG. 2, as the main reference bit line. Like all of the other reference bit lines, this has a parasitic bit line capacitance CPi. The value of parasitic bit line capacitances can in this case, for example, typically be 150 fF, and is thus considerably larger than the value of the capacitance of the ferroelectric memory capacitor CM. The main reference bit line /BL0 is connected to a reference potential VGEN via a charge transistor TL, which is of the p-channel type. This reference potential VGEN is provided by a voltage generator G, which is known per se, and is, for example, in a range from 1.2 V to 2.8 V with a voltage accuracy of 30 mV. The relative voltage error is, accordingly, 2.5% to 1%. The gate of the charge transistor TL is connected to a charge signal connection of the control unit CH (FIG. 2). Furthermore, the main reference bit line /BL0 is connected to the three further reference bit lines /BL1, /BL2, /BL3 via three series-connected equalization transistors TAi. The gates of the equalization transistors TA are, in turn, connected jointly to a shared signal connection of the control unit CH (FIG. 2). All of the other bit lines, which are used as reference bit lines, in the ferroelectric memory are connected to one another in groups of four, likewise as shown in FIG. 2, in order to produce the bit line reference voltage accurately. In this case, alternatively, BL1, /BL1, BL2, /BL2, for example, could also be connected to one another as a corresponding group of four reference bit lines.

The function and the operating method of the circuit configuration shown in FIGS. 1 and 2 will be explained in the following text with reference to the voltage/time graph for the bit line reference voltages V/BLi shown in FIG. 3. In this case, it is assumed that VGEN=2.8 V. At the time t=0, the value of the voltage V on all of the reference bit lines is, for example, 0 V. The charge transistor TL and the equalization transistors TA, that is to say the switches that they represent, are open (CH=1, SH=0). Approximately at the time t=1.5 ns, the charge signal CH is set to 0 in order to prepare for a read process from the memory capacitor CM via the bit line pair BL1, /BL1 (FIG. 1). The switch formed by the charge transistor TL is thus closed. The parasitic capacitance CP0 of the main reference bit line /BL0, which is thus connected to the reference voltage source, is charged to the value of the reference potential VREF=2.8 V. This value is reached approximately at the time t=6 ns, with the time profile as shown in FIG. 3 being governed by the value of the parasitic capacitance, the on-resistance of the charge transistor TL and the resistance of the reference bit line /BL0. In order to allow the charging process to be carried out as quickly as possible, the on-resistance of the charge transistor TL can be chosen to be as low as possible, or the transistor TL can be actuated using a lower gate voltage. Approximately at the time t=7.5 ns, the switch formed by the charge transistor TL is opened (CH=1). The parasitic capacitance of the main reference bit line /BL0 is thus disconnected from the reference voltage source. Furthermore, the switches formed by the three equalization transistors TA are closed; that is to say CH=1 and SH=1. The charge stored in the parasitic capacitance CP0 of the main reference bit line /BL0 is now also distributed between the three parasitic capacitances CP1, CP2, CP3 (which are connected to it) of the further reference bit lines /BL1, /BL2, /BL3. Since the line resistances differ, the charge stored in the parasitic capacitance CP0 of the main reference bit line flows with a different speed to the other three parasitic bit line capacitances CP1, CP2, CP3. Alternatively, it would also be possible to provide for the individual equalization transistors TA to be switched on with a time delay between them. However, this would lead to the charge equalization process being slowed down. According to FIG. 3, the bit line potentials VBLi at the time t=10 ns have all reached the same value of exactly 2.8 V/4=0.7 V, since the charge equalization process has been completed. If the relative accuracy of the reference voltage source is, for example, 2%, the relative accuracy of the four potential levels is in this case likewise exactly 2%. The four potential levels are in this case matched exactly since the values of the four parasitic bit line capacitances CPi are matched exactly. The three equalization transistors TA are then switched off once again, that is to say SH=0, at the time t=12 ns. The reference bit lines BLi are thus disconnected from one another once again in order to make it possible reliably to prevent any disadvantageous mutual influence during the subsequent read process. Then, controlled by the control unit C, the switches represented by the transfer transistors T are closed, and the differential sense amplifier SA reads the contents of the memory capacitor CM, and then once again writes the logic information back to the memory cell. This is done, as described above, by measuring the difference between the potentials on the bit line BL1 and the reference bit line /BL1.

We claim:

1. An integrated memory, comprising:

word lines;

bit line pairs, each one of said bit line pairs including a first bit line and a reference bit line for receiving a bit line reference voltage, said reference bit line of one of said bit line pairs defining a main reference bit line;

intersections defined by locations where said word lines and said bit line pairs intersect;

memory capacitors disposed adjacent said intersections of said word lines and said bit line pairs, a particular one of said memory capacitors disposed adjacent a particular one of said word lines and adjacent a particular one of said bit line pairs, said particular one of said bit line pairs including a particular one of said first bit lines and a particular one of said reference bit lines;

a selection transistor having a control electrode connected to said particular one of said word lines, said selection transistor connecting said particular one of said memory capacitors to said particular one of said first bit lines;

transfer transistors connected to said particular one of said bit line pairs;

a differential write/read amplifier connected, by said transfer transistors, to said particular one of said bit line pairs for reading data from and writing data to said particular one of said memory capacitors;

a charge switching element for receiving a reference voltage and for connecting said main reference bit line to the reference voltage; and an equalization switching element;

said reference bit line of one of said bit line pairs defining an additional reference bit line having a parasitic capacitance, said main reference bit line having a parasitic capacitance;

said equalization switching element for connecting said additional reference bit line to said main reference bit line to equalize charge between said parasitic capacitance of said main reference bit line and said parasitic capacitance of said additional reference bit line.

2. The memory according to claim 1, comprising a reference voltage source providing the reference voltage to said charge switching element.

3. The memory according to claim 2, comprising:

three equalization switching elements;

said reference bit lines of three of said bit line pairs defining three further reference bit lines;

said three equalization switching elements connecting said main reference bit line to said three further reference bit lines for charge equalization.

4. The memory according to claim 1, comprising:

three equalization switching elements;

said reference bit lines of three of said bit line pairs defining three further reference bit lines;

said three equalization switching elements connecting said main reference bit line to said three further reference bit lines for charge equalization.

5. The memory according to claim 4, wherein said three equalization switching elements are connected in series.

6. The memory according to claim 1, wherein said charge switching element is a p-channel transistor.

7. The memory according to claim 1, wherein said memory capacitors are ferroelectric capacitors.

8. A method for producing a reference voltage on reference bit lines of an integrated memory, which comprises:

providing an integrated memory including memory capacitors, a differential amplifier for reading data from one of the memory capacitors, a bit line pair including a first bit line and a corresponding reference bit line for receiving a bit line reference voltage, a main reference bit line having a parasitic capacitance, and at least one further reference bit line having a parasitic capacitance;

connecting the differential amplifier to the bit line pair;

connecting a reference voltage to the main reference bit line;

disconnecting the reference voltage from the main reference bit line; and connecting the at least one further reference bit line in parallel with the main reference bit line to:
 connect the parasitic capacitance of the main reference bit line and the parasitic capacitance of the further reference bit line in parallel,
 equalize charge stored in the parasitic capacitance of the main reference bit line and in the parasitic capacitance of the further reference bit line, and
 split the reference voltage into a number of bit line reference voltages of equal magnitude.

9. The method according to claim 8, which comprises, after the charge has been equalized, using at least one equalization switching element to disconnect the at least one further reference bit line from the main reference bit line.

10. The method according to claim 8, which comprises providing the memory capacitors as ferroelectric capacitors.

* * * * *